June 14, 1949.  H. A. HUFF, JR  2,472,948
CUTTING AND WELDING MACHINE
Filed March 20, 1945  4 Sheets-Sheet 1

INVENTOR.
Harry A. Huff, Jr.
BY
ATTORNEYS.

June 14, 1949. H. A. HUFF, JR 2,472,948
CUTTING AND WELDING MACHINE
Filed March 20, 1945
4 Sheets-Sheet 2
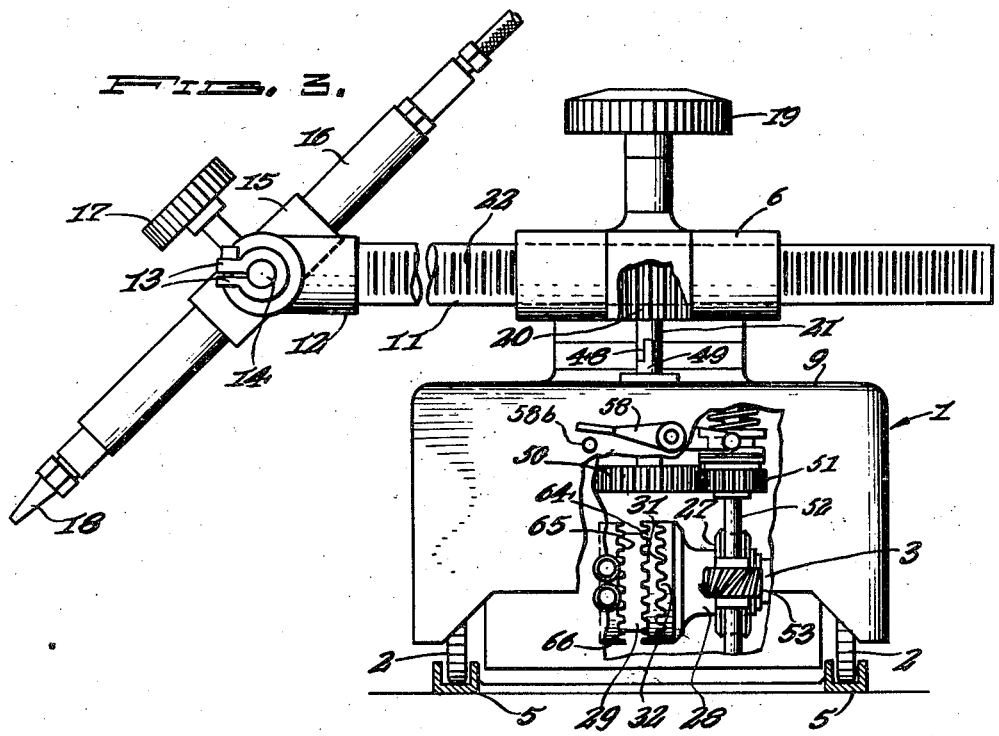
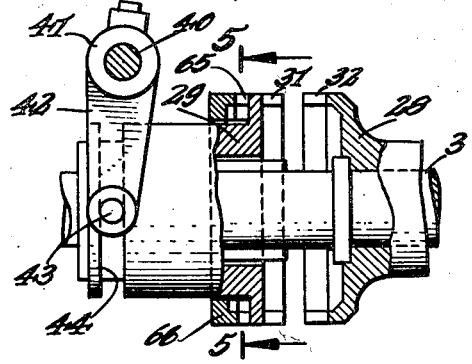
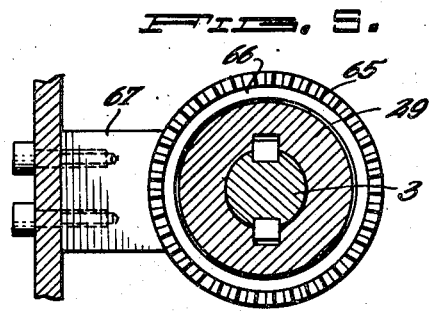
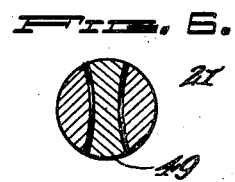
INVENTOR.
Harry A. Huff, Jr.
BY
ATTORNEYS.

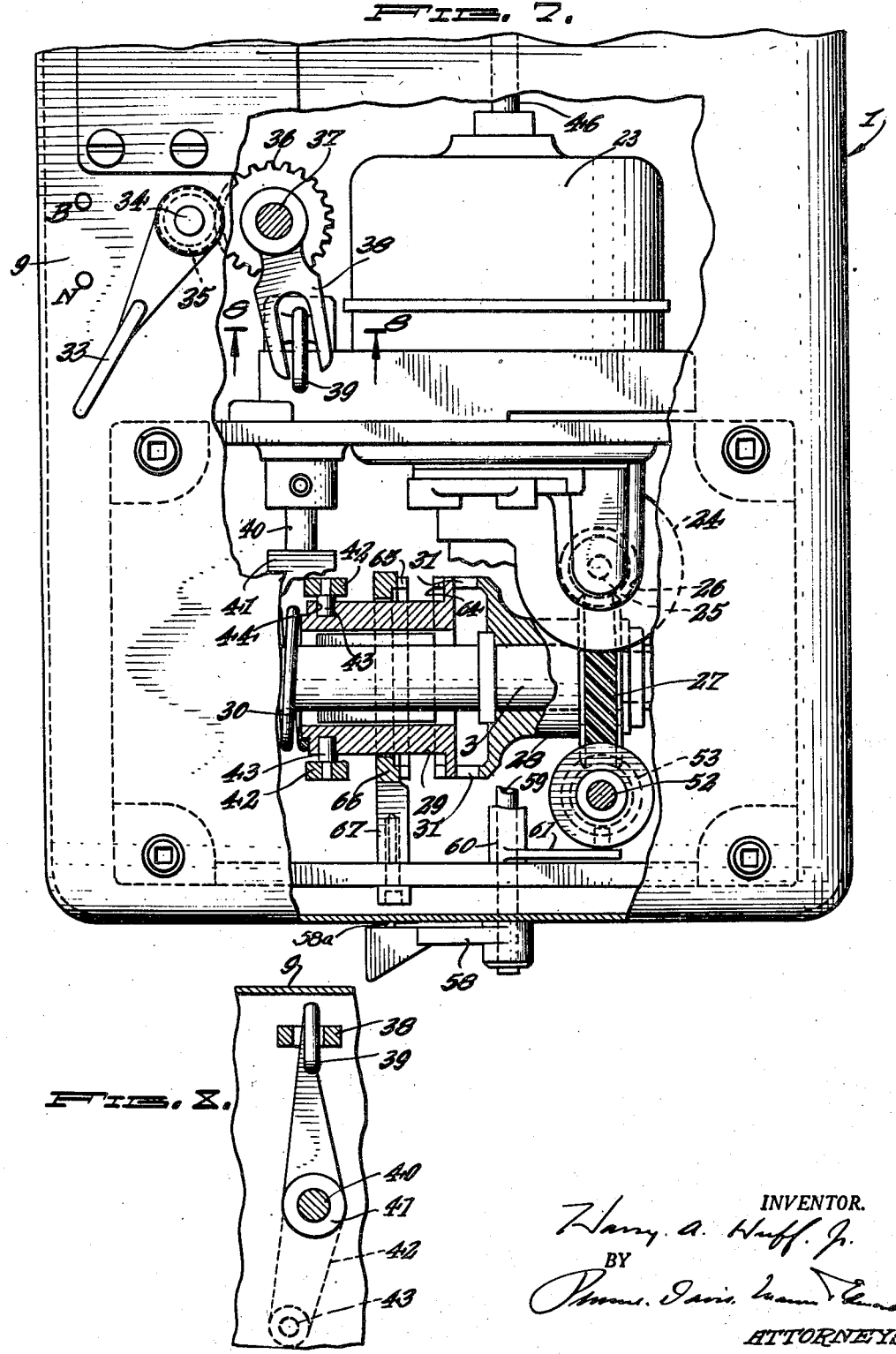

June 14, 1949.  H. A. HUFF, JR  2,472,948
CUTTING AND WELDING MACHINE
Filed March 20, 1945  4 Sheets-Sheet 4
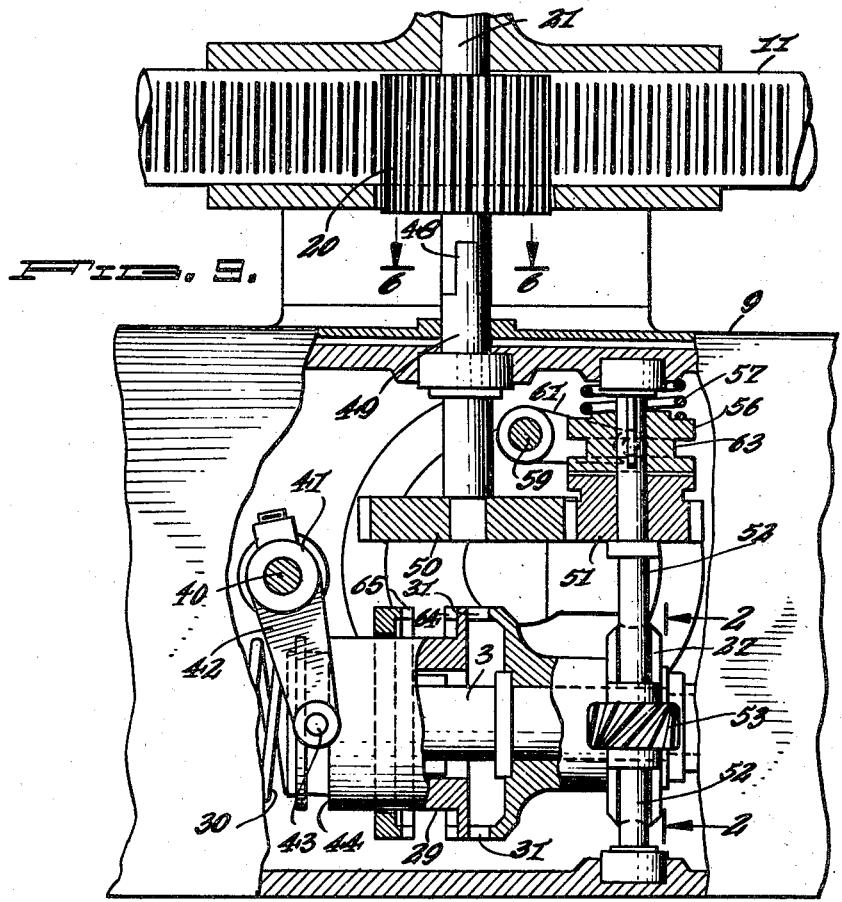
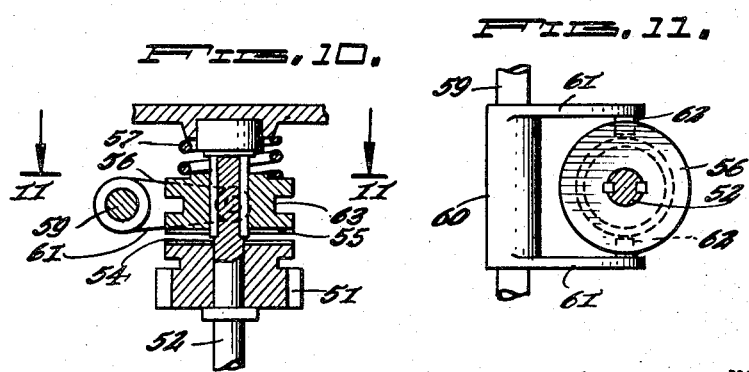
INVENTOR.
Harry A. Huff, Jr.
BY
ATTORNEYS Patented June 14, 1949

2,472,948

UNITED STATES PATENT OFFICE 2,472,948

CUTTING AND WELDING MACHINE

Harry A. Huff, Jr., Jersey City, N. J., assignor to Air Reduction Company, Incorporated Application March 20, 1945, Serial No. 583,818

1 Claim. (Cl. 266—23)

This invention relates to improvements in portable cutting and welding machines of the type in which a self-propelled torch carriage carries a torch for cutting or welding metal along a line substantially parallel to the line of travel of the carriage when the carriage is propelled at a uniform cutting or welding speed, and in which the torch is mounted on a torch-carrying arm which can be adjusted manually longitudinally of itself in a direction transverse to the line of travel of the carriage.

The principal object of the invention is to broaden the usefulness of a machine of this character by adapting it for cutting or welding at a uniform speed in a direction transverse to the line of travel of the carriage.

Another object of the invention is to modify a machine of the kind referred to so that the motor which propels the torch-carriage at a uniform speed can also be used to move the torch-carrying arm longitudinally of itself at a uniform speed to cause the torch carried by it to make the transverse cut or weld.

Other objects and advantages of the invention will hereinafter appear.

A portable cutting or welding machine embodying the invention in its preferred form is illustrated in the accompanying drawings, in which—

Fig. 3 is a front elevation of the machine shown in Fig. 1, a portion of the front wall of the carriage being broken away to expose some of the mechanism within the carriage for driving the carriage and the torch-carrying arm;

Fig. 4 is a detail view, partly in section, showing in disengaged position the clutch that establishes or breaks the driving connection from the motor to the carriage wheels;

Fig. 5 is a vertical transverse section taken on the line 5—5 of Fig. 4;

Fig. 6 is a horizontal section taken on the line 6—6 of Fig. 9;

Fig. 7 is a plan view of a part of the carriage drawn to an enlarged scale, a portion of the carriage deck being broken away to expose some of the driving mechanism within the carriage;

Fig. 8 is a vertical section taken on the line 8—8 of Fig. 7;

Fig. 9 is a front elevation of a part of the carriage drawn to an enlarged scale, a portion of its front wall being broken away to expose some of the driving mechanism;

Fig. 10 is a detail view in vertical section showing in disengaged position the clutch that establishes or breaks the driving connection from the motor to the torch-carrying arm; and Fig. 11 is a horizontal section taken on the line 11—11 of Fig. 10.

Figure 1:
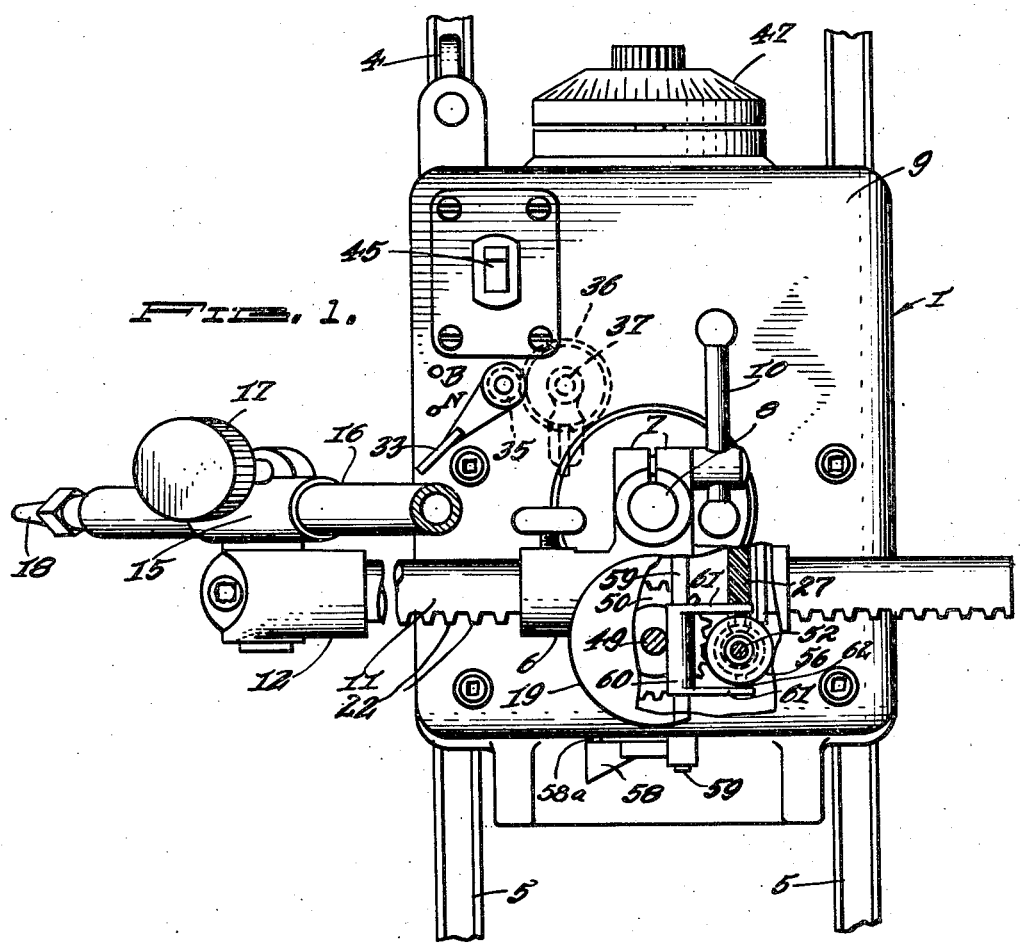
Fig. 1 is a plan view of the machine.
Figure 2:
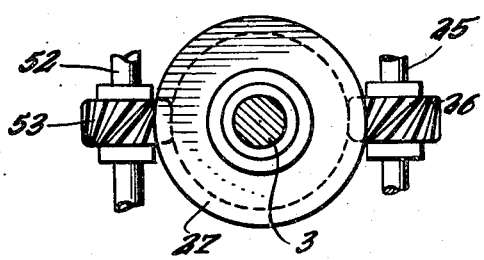
Fig. 2 is a vertical transverse section taken on the line 2—2 of Fig. 9.

The portable machine to which the invention has been applied is a standard one known as a "Radiagraph." It comprises a carriage 1 provided at one end with a pair of wheels 2 (Fig. 3), at least one of which is fixed to an axle 3, and at its other end with a single caster wheel 4 (Fig. 1). Usually track rails 5 are provided on which the carriage wheels run. For convenience, the end of the carriage where the wheels 2 are located will be referred to as the front end, although the carriage may be moved by its motor in either direction along the track, so either end might be regarded as the front end.

A holder 6 for the torch-carrying arms has a split portion 7 which may be clamped to an upright post 8 on the carriage deck 9 by turning a handle 10. The torch-carrying arm 11 is mounted in the holder 6 so that it can slide therein longitudinally of itself and in a direction transverse to the line of travel of the carriage along the track 5. At one end the arm 11 carries a sleeve 12 provided with a split portion 13 (Fig. 3) in which the horizontal stud 14 of the torch holder 15 may be clamped. Either a cutting or welding torch 16 is mounted in the holder 15. The torch may be adjusted longitudinally in the holder by turning a knob 17 in a manner well understood in the art to space the torch-tip 18 the proper distance from the work, and the angular position of the torch may be adjusted by moving the torch holder 15 about the axis of the stud 14.

The torch-carrying arm 11 may be racked manually in its holder 6 to adjust the torch transversely of the carriage by turning a knob 19 on the holder. This turns a pinion 20 (Fig. 3) housed in the holder 6 and mounted on the knob-shaft 21. The pinion meshes with rack teeth 22 on the torch-carrying arm.

The carriage is propelled along the track 5 by driving the axle 3 and its wheels 2 from an electric motor. Sometimes the transmission unit of which the motor forms a part is positioned so that the motor is on top of the carriage, but for the purpose of the invention it is positioned so that the motor is located within the carriage as shown at 23 in Fig. 7. Through reduction gearing in the housing 24 the motor drives a vertical shaft 25 which carries a worm 26. This worm meshes with a worm wheel 27 fixed to a clutch sleeve 28 loosely mounted on the wheel axle 3. A cooperating clutch sleeve 29 is keyed to the axle 3 and is slidable thereon. A coil spring 30, encircling the axle 3, bears against the clutch sleeve 29 and biases it to the right, as viewed in Fig. 7, so that its clutch teeth 31 normally engage with the clutch teeth 32 on the sleeve 28 (see also Fig. 3). The clutch sleeve 29 may be shifted on the axle 3 to the left, as viewed in Fig. 7, to disengage the clutch by turning a hand lever 33 located above the carriage deck 9 to the neutral position marked N in Figs. 1 and 7. This lever is secured to the upper end of a short vertical shaft 34 which extends through the carriage deck, and just below the deck carries a pinion 35. The pinion meshes with a gear 36 on a shaft 37 to which is secured a yoke member 38. The arms of this yoke member embrace the upper end of a lever 39 (see also Fig. 8) secured to a horizontal shaft 40 which is journaled in the transmission assembly and extends forwardly over the axle 3. The shaft 40 has secured to it the sleeve 41 of a yoke member, the yoke arms 42 of which carry pins 43 which engage in a groove 44 in the slidable clutch sleeve 29 (Figs. 7, 8 and 9).

It will now be apparent that the motor continually drives the clutch sleeve 28, loose on the axle 3, and that when the teeth of clutch sleeves 28 and 29 are in engagement, the axle is driven through the clutch sleeve 29 that is keyed to it to propel the carriage. The clutch may be disengaged by turning the hand lever 33 to the neutral position N whenever it is desired to move the carriage along the track by hand. The motor is reversible and is controlled by an electric switch 45 on the carriage (Fig. 1) to propel the carriage in either direction along its track. The motor has an adjustable centrifugal governor (not shown) provided with an adjusting shaft 46 (Fig. 7) which extends to the rear end of the carriage where it carries an adjusting dial 47 (Fig. 1). By turning the dial 47 the centrifugal governor may be adjusted so that the motor propels the carriage at the desired uniform cutting or welding speed.

This completes the description of the machine in its standard form. The parts that have been added to make it possible to power drive the torch-carrying arm 11 from the motor 23 and move it longitudinally at a uniform speed in its holder 6 when it is desired to make a transverse cut or weld will now be described.

As best shown in Figs. 3 and 9 the shaft 21 which carries the driving pinion 20 of the torch-carrying arm, is extended downwardly below the pinion and coupled at 48 to the upper end of a vertical shaft 49 which extends down into the carriage. A gear 50 at the lower end of the shaft 49 meshes with a pinion 51 loose on a vertical shaft 52 journaled in the transmission unit. This shaft extends down to a position in front of the worm wheel 27 on the clutch sleeve 28 and is provided with a gear 53 which meshes with the worm wheel. The pinion 51 has a clutch face 54 (best shown in Fig. 10) adapted to cooperate with a clutch face 55 on a clutch sleeve 56 which is keyed to the shaft 52 and is slidable thereon. A coil spring 57 normally biases the sleeve 56 in a direction to engage the clutch. The clutch may be disengaged by moving a hand-lever 58 at the front end of the carriage (Figs. 1 and 7). A projection 58a on the back of the lever 58 engages a socket 58b (Fig. 3) in the housing to hold the lever 58 in the position that disengages the clutch. A similar construction may be used for the clutch lever 33.

The lever 58 is attached to the outer end of a horizontal shaft 59 which extends into the interior of the carriage where it is secured to the sleeve 60 of a yoke member. The yoke member has a pair of arms 61 provided with pins 62 which engage in a groove 63 in the slidable clutch sleeve 56 (see particularly Figs. 1, 10 and 11). Thus, it will be seen that turning the hand-lever 58 anti-clockwise causes the yoke arms 61 and their pins 62 to lift the clutch sleeve 56 and disengage the clutch. As previously described, the worm wheel 27 is continuously driven from the motor through the worm 26 and therefore the worm wheel will continuously drive shaft 52 through the gear 53. When the loose pinion 51 is coupled to the shaft 52 by the keyed clutch sleeve 56 it will rotate the gear 50 and thus drive the pinion 20 that meshes with the rack teeth on the torch-carrying arm 11. Thus, whenever the clutch controlled by the hand-lever 58 is in engagement the torch-carrying arm will be moved at uniform speed by the carriage motor in one direction or the other depending upon the direction of rotation of the motor.

It will now be apparent that when the clutch through which the torch-arm is driven is disengaged by the hand-lever 58, the torch-arm may be adjusted in its holder 6 manually in the usual way by turning the knob 19. Also, when this clutch is disengaged and the carriage clutch is engaged by the hand-lever 33 the carriage may be propelled at a uniform speed in either direction along its track by the motor so that the torch will make a longitudinal cut or weld. When the carriage clutch is disengaged and the torch-arm clutch is engaged the torch arm may be power driven at a uniform speed in either direction in its holder by the carriage motor so that the torch will then make a transverse cut or weld. The gear ratios are such that the speed of travel of the torch-arm transversely of the carriage and the speed of travel of the carriage along its track are substantially the same for any given setting of the motor governor.

When shifting from a longitudinal cut or weld to a transverse one in making a continuous cut or weld, it is necessary to stop the momentum of the carriage along its track before the torch-arm clutch is engaged. To accomplish this the hand-lever 33, when manipulated to disengage the carriage clutch, is moved beyond the neutral position N (Figs. 1 and 7) to the brake position B. This moves the slidable clutch sleeve 29 far enough to the left, as viewed in Figs. 3 and 7, to bring teeth 64 at the rear of the sleeve's clutch face into engagement with teeth 65 on an annular ring 66 which encircles the clutch sleeve and is held against rotation by an arm 67 (Figs. 5 and 7) bolted to the forward end of the transmission assembly. Thus, the ring 66 serves as a braking ring against whose braking surface the braking surface of the clutch sleeve 29 is brought when the clutch lever 33 is moved all the way to braking position, and this quickly stops the movement of the carriage along its track. Fig. 4 shows the slidable clutch sleeve moved to the brake position. When the clutch lever 33 is moved only to neutral position N the clutch sleeve 29 is in an intermediate or neutral position in which the clutch teeth 31 and 32 are disengaged and the braking teeth 64 and 65 are also disengaged. It is to this neutral position that the clutch sleeve must be brought by moving the clutch lever to position N when it is desired to move the carriage along its track by hand. When the clutch lever is in position B the carriage is locked against movement and therefore the clutch lever may be moved to this position to so lock the carriage whenever it is desired to make a transverse cut or weld.

When shifting from a transverse cut or weld to a longitudinal one in making a continuous cut or weld, it is not necessary to brake the motion of the torch-arm since it does not have sufficient momentum to require braking and stops quickly when the clutch through which it is driven by the motor is disengaged.

Since the motor can drive both the carriage and torch-arm simultaneously when both the carriage clutch and the torch-arm clutch are engaged, a cut or weld can be made at an angle of 45° to the direction of travel of the carriage. Thus, cuts or welds can be made along triangular and trapezoidal paths as well as along rectangular ones. In making an angular cut or weld the speed of torch travel is somewhat increased and it may therefore be necessary to reduce the motor speed by adjusting its governor when the torch speed is a critical factor in the cutting or welding operation.

I claim:

In a cutting or welding machine having a wheeled carriage, an axle for a pair of the wheels to which at least one of such wheels is fixed, an electric motor carried by the carriage, driving connections by which the motor can drive said axle to propel the carriage along a course at uniform cutting or welding speed, said connections including a clutch having a clutch sleeve keyed to the axle and a clutch sleeve loose on the axle and driven by the motor, one of said clutch sleeves being slidable on the axle into and out of engagement with the other clutch sleeve, manually operable means for sliding the slidable clutch sleeve on the axle to engage or disengage the clutch, a torch-arm mounted in a holder on the carriage for movement longitudinally of itself and transversely of the direction of travel of the carriage, a torch carried by the arm, and manually operable means for adjusting the torch-arm in its holder comprising rack teeth on the torch-arm meshing with an actuating pinion fixed to a knob-actuated shaft on the holder, the combination therewith of torch-arm driving connections between said loose clutch sleeve and said actuating pinion for the torch-arm by which rotation of the loose clutch sleeve by the motor may be utilized to drive the torch-arm in its holder at uniform cutting or welding speed, said torch-arm driving connections including a downward extension on the knob-actuated shaft of the pinion coupled to a shaft extending downwardly into the carriage, gearing between said last-named shaft and said loose clutch sleeve, a clutch in said torch-arm driving connections, manually operable means for operating said clutch, a brake surface on the slidable clutch sleeve of the carriage clutch, and a stationary brake surface into contact with which the brake surface on the slidable clutch sleeve can be brought by the manually operable means for the slidable clutch sleeve.

HARRY A. HUFF, Jr.

REFERENCES CITED

The following references are of record in the file of this patent:

UNITED STATES PATENTS

| Number | Name | Date |
|---|---|---|
| 1,176,584 | Madgett | Mar. 21, 1916 |
| 2,040,478 | Glaum, Jr. et al. | May 12, 1936 |
| 2,266,730 | Anderson et al. | Dec. 23, 1941 |

FOREIGN PATENTS

| Number | Country | Date |
|---|---|---|
| 403,695 | Great Britain | Dec. 28, 1933 |
| 577,237 | Germany | May 30, 1933 |